Patented Aug. 29, 1950 2,520,507

UNITED STATES PATENT OFFICE 2,520,507

KINESCOPE FOR SIMULTANEOUSLY PICKING UP AN OBJECT AND PRESENTING AN IMAGE

Henry O. Marcy, 3rd, Park Ridge, Ill., assignor to The Rauland Corporation, Chicago, Ill., a corporation of Illinois Application July 29, 1947, Serial No. 764,360

2 Claims. (Cl. 178—6.8)

This invention relates to television. More particularly, it relates to a television pick-up device employing an ordinary cathode ray tube to project a scanning spot of light on the object to be "picked-up" and a photoelectric tube to translate modulations of the projected light which are caused by unequal reflection from different elementary areas distributed over the area of the object being scanned into an electrical signal having corresponding variations distributed in time.

In the art of television the functions of "picking-up" images and of presenting to view facsimiles of picked-up images have been performed by different devices. The iconoscope is a well-known pick-up device and the cathode ray tube or kinescope is the usual indicator or viewing device.

Iconoscopes exist in smaller numbers than viewing tubes for the same reasons that broadcast transmitters are fewer than homes receivers, and correspondingly they are very much more expensive. Kinescopes, on the other hand, are abundant and relatively inexpensive. They are widely used in laboratory apparatus, detection devices, navigational aids and other devices requiring a similar kind of video indication. In addition to mass production which leads to the relatively lower cost of kinescopes, the manufacturing processes required to produce them are simpler and less expensive.

For the purpose of economy, it would be highly desirable to be able to employ relatively inexpensive cathode ray tubes to take the place of iconoscopes if they could be adapted to perform the same pick-up function.

Moreover, it would be even more desirable, and particularly so for the purpose of even further economy, if a kinescope could be adapted to function simultaneouly as a viewing tube and a pick-up device.

It is an object of this invention to devise apparatus whereby a cathode ray viewing tube can be employed to perform a projected spot of light scanning operation which, in conjunction with the functionings of associated elements can translate values of light reflected from elementary areas distributed over the whole area of an object into electrical variations distributed in time, e. g., to perform the normal function of an iconoscope.

It is a further object of this invention to devise apparatus whereby a kinescope may be employed to perform the function described above and simultaneously to perform the converse function of converting electrical impulses into a video image, e. g. the usual display function of a kinescope.

It is another object of this invention to devise a combined pick-up and display device arranged so that a person, by observing an image displayed to view thereon, will of necessity look directly into the "eye" of the pick-up element.

Other objects, features and advantages of this invention will be apparent from the following description of this invention and from the drawing, in which:

Fig. 1 is a schematic representation of an embodiment of this invention; and

Figs. 2, 2*a* and 2*b* are plots of voltage against time. They represent types of voltage wave forms occurring at different points in the circuit of the device shown in Fig. 1.

Referring to Fig. 1, cathode ray viewing tube 1 is a conventional kinescope. As shown in the drawing, it is adapted for magnetic deflection but this is not essential. The electron beam of viewing tube 1 is made to scan fluorescent screen 2, in the usual manner of a television scan, by currents provided by sweep generator, block 3. Lens 4 represents conventional optical means whereby at any instant of time the scanning spot of light emitted by screen 2 and projected toward lens 4 is brought to focus on object 5 and caused to illuminate an elementary area thereof. Assuming that the projected scanning spotlight is of constant intensity, nevertheless the portions of that light reflected from elementary areas of the scanned area of object 5 will be of different intensities due to variations in the coefficients of reflection of those elementary areas. In other words, the intensity of the scanning spotlight will be modulated by certain optical characteristics of the object being "picked-up." A second lens 6 is arranged to gather reflected light from all of the scanned (or spotlighted) area of the object and to focus it on the light sensitive portion of a photoelectric cell 7. The total amount of light reaching the sensitive element of the photoelectric cell from object 5 at any instant of time will be substantially all of the reflected ambient light therefrom which is intercepted by second lens 6 plus as much of the scanning spotlight as at that instant was reflected from an elementary area of object 5 then illuminated by the projected spotlight and was intercepted by second lens 6. If the reflected ambient light is below the dark light current level of the photoelectric cell and if the reflected spotlight is above that level, the output of cell 7 will be an electrical signal having variations (which are distributed in time) substantially proportional to variations in coefficients of reflection of the elementary areas distributed over the area of the object 5. It is thus seen that elements 4, 6 and 7 perform the more essential functions required to adapt a kinescope for use as a pick-up device. Obviously, the usual power supplies, sweeping circuits and other conventional auxiliary elements must be employed and be properly connected.

While a photoelectric tube does not receive as individual signals the simultaneous multitude of discrete light values from separate elementary areas of objects it views, e. g. while it does not employ a mosaic element similarly to the light sensitive portion of an iconoscope, yet the photoelectric tube unavoidably receives light from the whole area of the object and receives it as a single lumped light value. Such a lumped light value will reach it if there is any ambient light. Since it will be impractical to pick up objects only in completely dark settings, ordinarily the reflected scanning light will be but a small part of all the light reaching the photoelectric tube. Obviously, it is desirable that the amount of the spotlight reflected from the object at any time during the scanning be an appreciable part of the total light reflected from the whole area of the object. That is to say the amount of the scanning spotlight must be significant with respect to all the ambient light unavoidably received by the photoelectric tube and must be sufficient to raise the total light received by it to a point higher than the operating limit already mentioned which may be described further as its dark light current threshold. The ambient light should be substantially below this level so that even if it varies a little from time to time (always, however, remaining below that level) no varying signal will be emitted from the photoelectric tube due to ambient light effects. The scanning spotlight, on the other hand, should be of such intensity that the spotlight reflected even from the least reflective elementary area, e. g. a light absorbing or "dark" area, of the object will represent a sufficient increment to raise the total light received by the photoelectric tube to some value above its dark light current threshold. Then two desired effects will occur. The first desired effect will be that the presence of ambient light will have a minimum or zero effect. The second is that the electrical signals generated by the photoelectric tube will vary unfailingly for every variation in reflecting light as the spotlight scans the object.

Though certain expensive, high-performance cathode ray tubes requiring dangerously high anode potentials are capable of emitting considerable light, e. g. projection kinescopes, ordinary less expensive viewing tubes are not. To secure increased light emission from an ordinary viewing tube the usual practice is to increase its electron beam current. There are definite limits, however, to how much it can be increased. If these limits are exceeded, possible results include excessive cathode emission, fluorescent screen burning, and the causing of ion spots. According to this invention, very great instantaneous light intensities are obtained from ordinary cathode ray viewing tubes without causing these undesirable results. This is accomplished by modulating the electron beam (intensity modulating the cathode ray tube with low duty cycle large amplitude pulses) so that while the average beam current is not substantially increased, or even while it is decreased, extremely high beam current peaks of very short durations occur periodically. Periodically the scanning spotlight has very great light intensity. The photoelectric tube is a peak reading device and is capable of responding to these very short pulses of light. Therefore, the output of the photoelectric tube is a series of electrical pulses. The amplitudes of these pulses vary (i. e. the pulses are modulated) in accordance with variations in reflection of the scanning spotlight by different elementary areas of the object being picked up.

If both the durations of the pulses and the decay time of the fluorescent screen are very short, it is possible that the brilliant pulses of light will not be visible to the human eye. Even if the eye is considered to be capable of integrating these pulses, the average intensity will be made very low if the pulses are of low duty cycle.

Pulse generator 8 may be a conventional free running pulse generator of any one of a variety of well-known types and does not have to be in synchronism with the sweep generator. It generates continuous pulses at a frequency corresponding to one pulse of a picture element. The pulse generator is connected to the control grid of cathode ray tube 1 and also to demodulator 9. Demodulator 9 alters the wave form of the pulsed voltage coming from photoelectric tube 7 by "stretching" the width of the pulses until the trailing edge of each pulse coincides with the leading edge of the next pulse in succession after it and so that each pulse no longer drops in voltage to a reference level such as zero at its trailing edge. In effect, the pulsed carrier is separated from the amplitude modulations impressed thereupon.

For the purpose of this application and, in particular, of the claims, demodulator 9 may be said to remove the pulses from the electrical signal coming from amplifier 10 and to leave an envelope defining their modulations.

The modulated pulses from photoelectric tube 7 are connected to a video amplifier 10. A clamping device 11 is interposed between the output of photoelectric tube 7 and the input of amplifier 10. Its function is to set and maintain a reference level to which the modulated amplitude of each pulse can be related. Clamping device 11 may be designed in accordance with any one of a variety of well-known conventional circuits.

Demodulator 9 may consist of a device sometimes described as a "box car" circuit. This is a circuit including a condenser which at predetermined times is provided with a charging or discharging path having a very short time constant, and at other predetermined times is allowed to maintain the new potential across its plates due to an open discharge path or one having a very long time constant. A pulse coming from amplifier 10 causes a condenser in demodulator 9 either to be charged or discharged nearly instantly, the potential across its plates being made equal or proportional to the amplitude of the pulse, and thereafter the voltage across its plates remains substantially fixed at that value until the instant when the next pulse occurs. If the time between pulses is X, a pulse (coming from amplifier 10) which has a duration or "width" of X/10 and an amplitude of Y, will be converted into a new pulse having the same amplitude (or an amplitude mathematically related to Y by a constant K) and having a duration or "width" of X. The output of demodulator 9 may be considered as the output video signals of this pick-up device.

These video signals may be led to the intensity modulating electrode (the control grid) of a cathode ray tube located in a receiving station and employed therein as a viewing device. The durations of the successive light emissions produced by intensity modulating a viewing kinescope with this video voltage are such that, without further prolongation by the use of a long persistent fluorescent screen, the human eye is easily able to see the image produced on the viewing screen.

Another advantage of pulsing the scanning spot light source is that, in effect, this generates a carrier frequency which, of course, is modulated by the electrical signals generated by photoelectric tube 6. This eliminates the need for very low frequency response in subsequent amplifiers and circuits and does so without substantial distortion since one can put in direct current insertion to the bottom of the pulse (in this case the ambient light level) before demodulating with the box car circuit.

Another advantage of pulsing a cathode ray tube, which is being used as a scanning spotlight source in a pick-up device, is that it permits the same tube simultaneously to be used as a viewing tube. As already explained the pulsed scanning spotlight may not be visible at all (to the human eye) even though its pulses are very intense and, at best, only its average emission (low level and uniform) will be visible. Therefore, it is feasible to adapt the same cathode ray tube to function as a viewing tube so that it will present an image at the same time that it is spotlight scanning. Obviously the average level of light emitted from the image thus portrayed by a kinescope performing such a dual function should be relatively much lower than the peak level of the spotlighting pulses. The light emitted by that image may be of the same general order of intensity as the ambient light, i. e. below dark light current threshold of the photoelectric tube. Assuming that each spotlighting pulse is 5 percent of a picture element in duration and that the intensity of the light emitted by the fluorescent screen during each pulse is the maximum for a given cathode ray tube and that the high lights of the image produced thereon in dual operation are at the same level, then the minimum brightness of any picture element will be no lower than 5 percent of the intensity of the high lights (assuming that the human eye will average out the spot lighting pulses). It is thus apparent that in a dual system of this kind, unless special fluorescent screens are used, a 20 to 1 contrast ratio is the best that could be obtained unless the scanning spotlight is modulated with pulses having a duty cycle even lower than 5 percent. It might be possible to improve the contrast ratio by using special fluorescent materials. For example, a screen could be used having two layers, one for emitting the scanning light, and one for emitting the image light. The eye responds well to white or yellow light. The image emitting layer therefore, should preferably have white or yellow emission. If it is a slow build-up (slow energizing) phosphor it will emit little or no light in response to the short duration intensity modulating pulses. The eye responds poorly to blue light, while a photoelectric tube responds well to it. Therefore, the scanning light emitting layer should have blue emission. It should have short energizing and decaying times. The former will permit a build up to full emission in response to the short duration intensity modulated pulses and the latter will keep the durations of the pulses of actual light emission almost as short as the durations of the intensity modulating voltage pulses.

Another advantage of this invention is economy. Obviously if a cathode ray tube can serve a dual purpose, it will permit considerable reductions in equipment requirements.

A further advantage is that where this invention is used in an intercommunication system, the person at each dual function station in viewing the image on the viewing tube will, of necessity, look directly into the "eye" of the pick-up apparatus. This will satisfy an important psychological requirement for such systems.

As has been explained above, pulsing the cathode ray tube in a spotlight scanner preferably should be done with very short duration pulses. In a 500 line television system a picture element corresponds to approximately a quarter of a microsecond. The pulses for intensity modulating the spotlight scanning cathode ray tube in such a system would have to have durations of a small fraction of that very small picture element. While excellent square-wave pulses of $\frac{1}{10}$ of a microsecond durations can be generated, by well-known circuits employing pulse transformers and positive feedback, pulses of much shorter durations then this will be very difficult to obtain. Hence, in a system embodying the principles of this invention in a practical manner at the present time and using the best pulse generators available according to the present state of the art, it might be expedient to use less than 500 scanning lines for each frame. In intercommunication systems far less than 500 lines would be quite adequate and in fact might be desirable because of the reductions in the cost of circuiting. As explained by C. A. Washburn in his notes on various types of sweep generators sweeps adapted to a simplified system using fewer lines can be more easily and more economically built than standard television sweeps.

In a dual system, such as an intercommunication system, sweep generator 3 would provide the sweep voltages for both stations, each of which would correspond to and/or include the apparatus shown in Fig. 1. Accordingly, the cathode ray tubes in both stations would be swept simultaneously and in the same manner.

Figs. 2, 2*a* and 2*b* show the wave forms of the voltages occurring at various points in the circuit of Fig. 1. Fig. 2 shows the low duty cycle, high intensity pulses for intensity modulating the scanning spotlight. Fig. 2*a* shows voltage impulses produced by photoelectric tube 6 in response to pulses of light reflected from the object being picked up. These pulses correspond in their durations and periods, and are synchronized with, the pulses of Fig. 2. Their amplitudes, however, are no longer uniform since they have been modulated by reflection from the object. Fig. 2*b* shows the output of demodulator 9 and indicates how the pulses of Fig. 2*a* are stretched in their widths or durations.

As shown in Fig. 3, in a dual system pulse generator 12 could be used to supply intensity modulating pulses to both stations just as the sweep generator provides sweeps to both stations. In a dual system both pulses and video signals are fed to the control grid of the cathode ray tube in each station and, therefore, it would be advisable to use a mixing device 18, 18*a* at each station, which device has different inputs for the separate signals and a common output for a composite signal to be fed to the control grid of the cathode ray tube in that station.

The other circuits, such as the sweep generator 13, the demodulators 14, 15, clamping device 16, 16a, and video amplifier 17, 17a, are connected in the circuit in a manner similar to that in Fig. 1. The sweep generator 13 is connected to the deflection systems of the cathode ray tube of each station. Two demodulators 14, 15 are employed, each of which is interconnected between the video amplifier of the one station and the one input of the mixer of the other station. The pulse generator 12 is connected to both demodulators 14, 15 and the other input of the mixer of both stations.

If desired, separate optical paths for focused and unfocused rays from the kinescope to the viewer may be provided and half silvered mirrors 19 and 19a, respectively, together with full mirrors 20 and 20a, respectively, and a lens 21 and 21a respectively may be used.

It is obvious that the device described herein can be described freely as adapted to "pick-up" the "image" of a "subject" and to translate it into an electrical signal and, accordingly, it may be designated, herein and in the claims, as a pick-up device and the words "image" and "subject" may also be used for simplicity and convenience. The "subject" is intended to be whatever is being picked up whether or not it includes a person or a background scene and irrespective of how many component physical objects are included in it. The word "image," though sometimes it is looked upon as pertaining to a subjective psychological sensory impression produced within us by subjects we see, is herein used also to indicate what may be conceived of as a bundle or array of thin shafts of reflected light of various intensities emanating unequally from a multitude of elementary reflective areas comprising the total area of the subject. The pick-up device thus picks up an image of a subject, light-intelligence emanating from it and translates it into electrical intelligence (which may be conveniently transmitted over long distances in any of many well-known ways).

What I claim is:

1. A television device for picking up light intelligence reflected from a subject and translating it into electrical intelligence and for translating electrical intelligence into a visible image consisting of a cathode ray tube having a fluorescent screen, an electron beam, and a control grid, the electron beam being adapted to fluoresce and emit light, means for scanning the fluorescent screen with the electron beam, means for intensity modulating the cathode ray tube with voltage pulses of relatively large amplitude and relatively low duty cycle so that the light which is emitted has successive peaks of high and predetermined intensity, optical means for focusing and projecting light from the fluorescent screen upon the subject as a scanning spot of periodically intensified light, photoelectric means adapted to intercept light reflected from said subject and to translate it into an electrical signal, the peaks of light acting upon the photoelectric means so that the electric signal is superimposed on a pulsed carrier, means for demodulating the electrical signal by removing the pulsed carrier, a clamping device causing any variations in said electrical signal to be related to a signal reference level, an amplifier for said electrical signal, mixer means having at least two input circuits and a common output circuit, the output circuit being connected to said control grid, a first of said input circuits being connected to said means for intensity modulating, an exterior source of electrical intelligence, and means for connecting the exterior source to another of the input circuits.

2. A television system including two television devices as in claim 1, means for feeding the electrical signal from the first of said television devices to one, but not the first, of the input circuits of the mixer means of the other television device, means for feeding the electrical signal from the other television device to one, but not the first, of the input circuits of the mixer means for the first television device, the means for intensity modulating being connected to the first input circuits of the mixer means of both television systems, and the means for scanning being common for the cathode ray tubes of both television devices.

HENRY O. MARCY, 3RD.

REFERENCES CITED

The following references are of record in the file of this patent:

UNITED STATES PATENTS

| Number | Name | Date |
|---|---|---|
| 1,863,278 | Nicholson | June 14, 1932 |
| 2,157,749 | DuMont | May 9, 1939 |
| 2,308,381 | Mertz | Jan. 12, 1943 |
| 2,314,471 | Wright | Mar. 23, 1943 |
| 2,424,349 | Cawein | July 22, 1947 |

FOREIGN PATENTS

| Number | Country | Date |
|---|---|---|
| 435,749 | Great Britain | Sept. 26, 1935 |
| 493,868 | Great Britain | Oct. 17, 1938 |

Certificate of Correction

Patent No. 2,520,507 August 29, 1950

HENRY O. MARCY, 3RD

It is hereby certified that error appears in the printed specification of the above numbered patent requiring correction as follows:

Column 6, line 66, paragraph beginning with the words "As shown in Fig. 3," strike out all to and including "in that station." in column 7, line 2;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*